Figure 1:
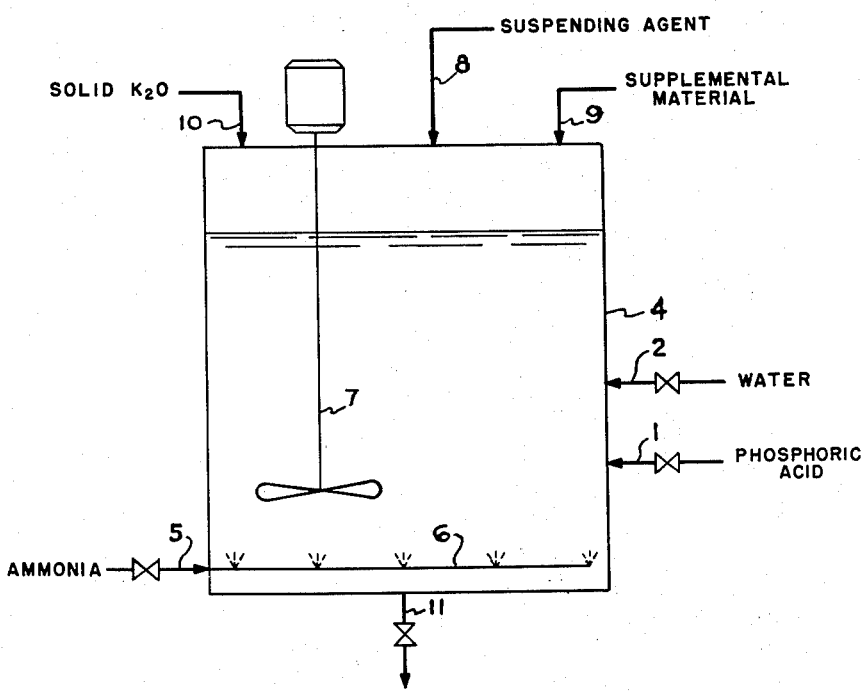

United States Patent Office 3,113,858
Patented Dec. 10, 1963

3,113,858
METHOD OF PRODUCING HIGH-ANALYSIS FERTILIZER SUSPENSIONS
Archie V. Slack, Sheffield, and Henry K. Walters, Jr., Florence, Ala., assignors to Tennessee Valley Authority, a corporation of the United States
Filed June 26, 1961, Ser. No. 119,741
6 Claims. (Cl. 71—42)
(Granted under Title 35, U.S. Code (1952), sec. 266)

The invention herein described may be manufactured and used by or for the Government for governmental purposes without the payment to us of any royalty therefor.

Our invention relates to an improved process for the production of high-analysis fertilizer suspensions, particularly fertilizer suspensions prepared from ammoniated wet-process phosphoric acid, and more particularly to the production of high-analysis fertilizer suspensions in which the cooling capacity requirements of the processing equipment are greatly reduced.

Heretofore the production and use of liquid fertilizers having compositions similar to those of standard dry fertilizers have been well known, and such fertilizers are increasing in popularity in the industry. Such liquid fertilizers have numerous advantages over dry-mixed fertilizers in that the costs of evaporating moisture and the bagging operation are eliminated. Such liquid fertilizers greatly simplify the operation of applying plant nutrients to the soil. Furthermore, the use of liquid fertilizers effectively eliminates the difficulties due to segregation and caking often encountered in storing dry fertilizers.

However, liquid fertilizers have, in the past had some outstanding disadvantages. Raw-material costs have proved to be relatively high, and the solutions produced have been in some instances so corrosive as to result in high maintenance and storage costs. The liquid fertilizers produced by prior-art methods also have been limited in the maximum content of plant food. The amount of water used as solvent in making liquid fertilizers in the prior-art methods has acted as a diluent which lowers the fertilizer grade, adds to the shipping weight, and increases transportation costs. Therefore, these low-grade fluid-type fertilizers and their related excess weight per unit of plant food are becoming less attractive from year to year as the general average analysis of solid fertilizers continually increases.

Our invention is directed to an improved process for producing a high-analysis suspension-type fertilizer which is stable, substantially non-settling, of low viscosity, and exhibits desirable flow properties. The product of the present invention is a suspension of fine crystals of one or more fertilizer salts in a saturated aqueous solution of the same salts. A small amount of suspending agent, which may be attapulgite, bentonite, or other clays, is also present in the suspension. We have also found that the material dolomite may be used as a suspending agent. We have found that less than about 5 percent of the suspending agent is required in our suspension and that usually from about 1 to 2 percent is sufficient for the most desirable results; and, with some formulations, we have found that less than 1 percent of the suspending agent is required.

In our copending application, Serial No. 819,516, filed June 10, 1959, of which this application is a continuation-in-part, we have indicated that the use of a nucleating agent therein causes the exces fertilizer salts to crystallize in the form of fine crystals that have been observed to remain suspended in a saturated solution of the same salts and that without the nucleating agent the crystals have been found to grow larger, settle to the bottom, and form a hard mass that makes the resulting product unusable. In the present invention it has been discovered that this beneficial action of the nucleating agent can be substantially improved by a unique combination of proper sizing of the solid raw materials and the cooling of the hot ammonium phosphate solution before solid raw materials are added. In addition, in the present invention the emphasis is on avoiding crystallization rather than promoting it, hence we prefer to refer to the agent as a suspending agent rather than a nucleating agent.

The method of the present invention is especially applicable when limited facilities are available for cooling the hot solution. As taught in our copending application, it was found therein to be necessary to cool the material rapidly to obtain the most desirable results. Although such a process yields excellent results, a substantial number of liquid fertilizer plants are not equipped with a cooler and, in many others, only sufficient cooling capacity is available to give a slow rate of cooling. In the process of the present invention the need for cooling capacity is substantially reduced, and in fact the present process has been found to be operable without the use of a cooler.

It is therefore an object of the present invention to provide a process for the manufacture of improved high-analysis fluid fertilizer suspensions which retain the advantageous fluid form while eliminating the disadvantage of low analysis.

Another object of the present invention is to provide a process for the production of stable suspensions of one or more solid fertilizer salts in a saturated aqueous solution of the same salts.

Still another object of the present invention is to provide a process for the manufacture of substantially non-settling suspensions of fertilizer salts having desirable flow properties and an acceptable viscosity.

A further object of the present invention is to provide an improved concentrated fluid fertilizer which may be produced either batchwise or continuously in equipment existing in present fertilizer plants.

In carrying out the objects of our invention in one form thereof we employ a reactor vessel and other equipment which is somewhat similar in design to that shown in our copending application. However, it will become apparent that such equipment has been modified to change the addition of nucelating agent to an addition of "suspending agent." In the present invention the suspending agent may be directly added to the reactor as dry clay, or alternatively the clay is predispersed in water before introduction into the reactor. We have found it most economical to employ this type of equipment for batch operation.

Our invention, together with further objects and advantages thereof wil be better understood from a consideration of the following description, taken in connection with the accompanying drawing, in which:

FIGURE 1 is a diagrammatical illustration showing the flow of materials in carrying out our process.

Referring now more specifically to FIGURE 1, phosphoric acid and water, from sources not shown, are introduced via lines 1 and 2 respectively into mixing vessel 4. Ammonia, from a source not shown, is introduced via line 5 and a perforated spider 6 located in the bottom of vessel 4. Vessel 4 is equipped with a motor-driven stirrer 7. The flow of the afore-mentioned materials is continued until the amounts required for the desired batch size and desired product composition have been added. A suspending agent is then added to the resulting hot ammonium phosphate solution at 8 while agitation is continued by means of stirrer 7. The contents of the vessel are cooled and any other liquid materials then added as shown at 9. This ordinarily wouud be a solution containing urea and ammonium nitrate. Finally, the solid materials which act as a supply of $K_2O$ are added in a finely divided form as shown at 10. Ordinarily, the only solid material used is potassium chloride. The finished suspension is withdrawn at 11.

Several variations of this procedure are within the scope of our invention. The essential requirements are that the hot ammonium phosphate solution be cooled before solid materials are introduced, and that the solid materials be of small particle size. The precooling minimizes dissolution of solids, and therefore subsequent recrystallization in the form of large crystals is reduced. The fine particle size promotes sprayability of the undissolved solids. The combination of these effects with the beneficial effect of the suspending agent gives a fertilizer suspension with properties superior to those produced by the prior art.

With these essential features in mind, it is obvious that the above procedure can be varied in several ways without departing from the spirit of our invention. Continuous rather than batch operation can be accomplished by using three vessels in line. In the first vessel, the reaction of ammonia and phosphoric acid is carried out; in the second, the hot solution is cooled; and in the third, the solid materials are added.

The materials used may also be varied. Although ammonia ordinarily is used to neutralize phosphoric acid, it is within the scope of this invention to use ammoniacal solutions containing supplemental nitrogen salts such as urea or ammonium nitrate. The phosphoric acid may be of either the furnace or the wet-process type; however, the most beneficial effects of the present invention are evidenced when phosphoric acid of the wet-process type is employed. This is due to the fact that such type acid contains substantial quantities of impurities which normally precipitate and settle out when such an acid is ammoniated. Supplemental materials added in solution form may be of several types, although a solution containing urea and ammonium nitrate is normally available in most liquid fertilizer plants. Finally, the solid materials used may be of any type, although potassium chloride is the solid most often used.

The order of addition of materials is not important, as long as the essential sequence of ammonium phosphate formation, cooling, and solids addition is preserved. It may be desirable to cool the ammonium phosphate solution before remaining liquid materials are added, in order to obtain more efficient use of the cooling medium used; however, this is not essential. The suspending agent, which can be added dry or as a water slurry, can be introduced at any convenient point in the flow diagram.

The degree of cooling of the ammonium phosphate solution before introduction of solid materials is essential to our invention. It is essential that the temperature of the suspension reach the ambient level quickly after the solid is added. The unavoidable partial dissolution of the solid gives some cooling, as does addition of any supplemental liquids. Therefore, it is necessary to cool the ammonium phosphate solution at least to such an extent that the further cooling brought about by supplemental liquids and by dissolution of the solid will bring the temperature down to ambient. The exact temperature to which the ammonium phosphate solution should be cooled to meet this requirement depends on the composition of the final suspension and also on the nature of the solid. For example, for a 12-12-12 suspension (12% N, 12% $P_2O_5$, and 12% $K_2O$) made from ammonia, phosphoric acid, urea-ammonium nitrate solution, and potassium chloride, the temperature required was about 140° F. When the clay slurry, nitrogen solution, and potassium chloride were added to the 140° F. ammonium phosphate solution, the temperature reached ambient almost immediately. For suspensions of other compositions, the required intermediate temperature level may vary in the range of about 140° F. to about 160° F.

It is obvious that the ammonium phosphate solution can be cooled to a lower temperature level than that specified above without departing from our invention.

The particle size of the solid materials is important. Since the particle size of the solids in the final suspension depends more on initial size than on degree of growth during recrystallization, as in the prior art, it is essential that the initial size be small enough to make the suspension usable. We have found that if the initial maximum crystal size is 20 mesh or smaller, the resulting suspension can be sprayed through spray nozzles of the sizes most often used in applying liquid fertilizer to the soil.

The suspending agent employed in our process may be any one of several very finely divided inert materials. Examples of these are clay, dolomite, and other naturally occurring mineral materials. One particular type of clay—attapulgite—has been found to give unexpectedly superior results. Attapulgite is anhydrous magnesium silicate, commonly known as attapulgus fuller's earth. The amount of suspending agent required depends mainly on the formulation. Not more than about 2 percent is usually required.

By the use of these suspending materials in the process described above, we have been able to produce a suspension-type fertilizer which has good handling properties and a plant-food content much higher than the usual true solution fertilizer. We have found that if the novel features of the present process are not incorporated, the excess salts in the reactor will crystallize as heavy masses that will settle to the bottom or stick to the sides of the reactor and thereby make the product unusable.

In order that those skilled in the art may better understand how the present invention can be practiced, the following examples are given by way of illustration, and not by way of limitation.

Example I

A 12-12-12 suspension (12% each by weight of N, $P_2O_5$, and $K_2O$) was prepared by feeding water, ammonia, and phosphoric acid simultaneously to give a neutral solution, cooling the solution to about 140° F., then adding a clay slurry, then adding urea-ammonium nitrate solution, and then potassium chloride. The clay slurry contained about 10 percent clay, and a quantity sufficient to give 1 percent clay in the final suspension was used. Addition of the supplemental materials reduced the temperature to 84° F. The potash used was 99.3 percent minus-20 mesh. After a week of storage the resulting suspension contained no plus-20 mesh crystals and could be sprayed readily through a 0.072-inch nozzle.

Example II

A suspension was prepared as an Example I; however, the supplemental materials were added to the hot ammonium phosphate solution without any prior cooling. The temperature was 204° F. when the materials were added, and 150° F. immediately thereafter. The finished product was allowed to cool normally to ambient temperature. After a week of storage, the suspension contained 3.3 percent by weight of plus-20 mesh crystals and would not spray through either a 0.072- or 0.078-inch nozzle.

Example III

A suspension was prepared as in Example I; however, all of the ammonium phosphate solution was allowed to cool all the way to ambient temperature before supplemental materials were added. This product contained only about 0.1 percent plus-20 mesh crystals after one week's storage and could be sprayed through a 0.078-inch nozzle.

Example IV

A suspension was prepared as in Example I; however, the particle size of the potash was increased so that only 92.5 percent was minus-20 mesh. The product contained 0.2 percent plus-20 mesh crystals after a week of storage and could not be sprayed through a 0.072-inch nozzle.

This application is a continuation-in-part of application Serial No. 819,516, filed June 10, 1959, in the names of Archie V. Slack et al.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. The method of producing a stable suspension-type fertilizer having high plant-food content, good flow properties, and low viscosity which comprises the steps of producing a hot ammonium phosphate solution by reacting together, and utilizing therefrom the autogenous heat of solution, an ammoniating fluid and phosphoric acid, said phosphoric acid selected from the group consisting of wet-process phosphoric acid and electric-furnace type phosphoric acid; cooling said hot ammonium phosphate solution to a temperature about intermediate the reaction temperature and ambient temperature; mixing in the resulting partially cooled ammonium phosphate solution an impalpable material selected from the clay group consisting essentially of attapulgite and bentonite in quantity sufficient to furnish about 1 to 5 percent of said impalpable material in the fertilizer to be produced; thereafter adding supplemental material to said partially cooled ammonium phosphate solution, said supplemental material selected from the group consisting of urea and ammonium nitrate; further cooling the resulting suspension to about ambient temperature through addition of solid fertilizer salts to said partially cooled ammonium phosphate solution, said salts selected from the group consisting of potassium carbonate, potassium nitrate, and potassium chloride and said salts being of particle size of about minus-20 mesh; and withdrawing said resulting suspension as product.

2. The method of producing a stable suspension-type fertilizer having high plant-food content, good flow properties, and low viscosity which comprises the steps of producing a hot ammonium phosphate solution by reacting together, and utilizing therefrom the autogenous heat of solution, an ammoniating fluid and phosphoric acid, said phosphoric acid selected from the group consisting of wet-process phosphoric acid and electric-furnace type phosphoric acid; cooling said hot ammonium phosphate solution to a temperature about intermediate the reaction temperature and ambient temperature; mixing in the resulting partially cooled ammonium phosphate solution an impalpable material selected from the clay group consisting essentially of attapulgite and bentonite in quantity sufficient to furnish about 1 to 5 percent of said impalpable material in the fertilizer to be produced; thereafter adding supplemental material to said partially cooled ammonium phosphate solution, said supplemental material selected from the group consisting of urea and ammonium nitrate; further cooling the resulting suspension to about ambient temperature through addition of solid fertilizer salts to said partially cooled ammonium phosphate solution, said salts selected from the group consisting of potassium carbonate, potassium nitrate, and potassium chloride and said salts being of particle size of about minus-20 mesh; withdrawing said resulting suspension as product; and said method being characterized by the fact that at least one-third of the total quantity of fertilizer material is present in the form of minute crystals in said suspension.

3. The method of producing a stable suspension-type fertilizer having high plant-food content, good flow properties, and low viscosity which comprises the steps of producing a hot ammonium phosphate solution by reacting an ammoniating fluid and phosphoric acid, said phosphoric acid selected from the group consisting of wet-process phosphoric acid and electric-furnace type phosphoric acid at a temperature about 200° F.; cooling said hot ammonium phosphate solution to a temperature in the range of about 140° F. to about 160° F.; mixing in the resulting partially cooled ammonium phosphate solution an impalpable material selected from the clay group consisting essentially of attapulgite and bentonite in quantity sufficient to furnish about 1 to 5 percent of said impalpable material in the fertilizer to be produced; thereafter adding supplemental material to said partially cooled ammonium phosphate solution, said supplemental material selected from the group consisting of urea and ammonium nitrate; further cooling the resulting suspension to about 80° F. through addition of solid fertilizer salts to said partially cooled ammonium phosphate solution, said salts selected from the group consisting of potassium carbonate, potassium nitrate, and potassium chloride and said salts being of particle size of about minus-20 mesh; and withdrawing said resulting suspension as product.

4. The method of producing a stable suspension-type fertilizer having high plant-food content, good flow properties, and low viscosity which comprises the steps of producing a hot ammonium phosphate solution by reacting an ammoniating fluid and phosphoric acid, said phosphoric acid selected from the group consisting of wet-process phosphoric acid and electric-furnace type phosphoric acid at a temperature about 200° F.; cooling the ammonium phosphate solution to a temperature in the range of about 140° F. to about 160° F.; mixing in the resulting partially cooled ammonium phosphate solution an impalpable material selected from the clay group consisting essentially of attapulgite and bentonite in quantity sufficient to furnish about 1 to 5 percent of said impalpable material in the fertilizer to be produced; thereafter adding supplemental material to said partially cooled ammonium phosphate solution, said supplemental material selected from the group consisting of urea and ammonium nitrate; further cooling the resulting suspension to about 80° F. through addition of solid fertilizer salts to said partially cooled ammonium phosphate solution, said salts selected from the group consisting of potassium carbonate, potassium nitrate, and potassium chloride and said salts being of particle size of about minus-20 mesh; withdrawing said resulting suspension as product; and said method being characterized by the fact that at least one-third of the total quantity of fertilizer material is present in the form of minute crystals in said suspension.

5. The method of claim 2, which method is further characterized by the fact that the product has a suspension volume greater than about 70 percent.

6. The method of claim 4, which method is further characterized by the fact that the product has a suspension volume greater than about 70 percent.

References Cited in the file of this patent

UNITED STATES PATENTS

| | | |
|---|---|---|
| 2,324,079 | Greger | July 13, 1943 |
| 2,683,658 | Saunders | July 13, 1953 |
| 2,971,292 | Malecki | Feb. 14, 1961 |